Aug. 29, 1939.  F. MADDEN  2,171,451
RAKE ATTACHMENT FOR CULTIVATORS
Filed March 10, 1938   2 Sheets-Sheet 1
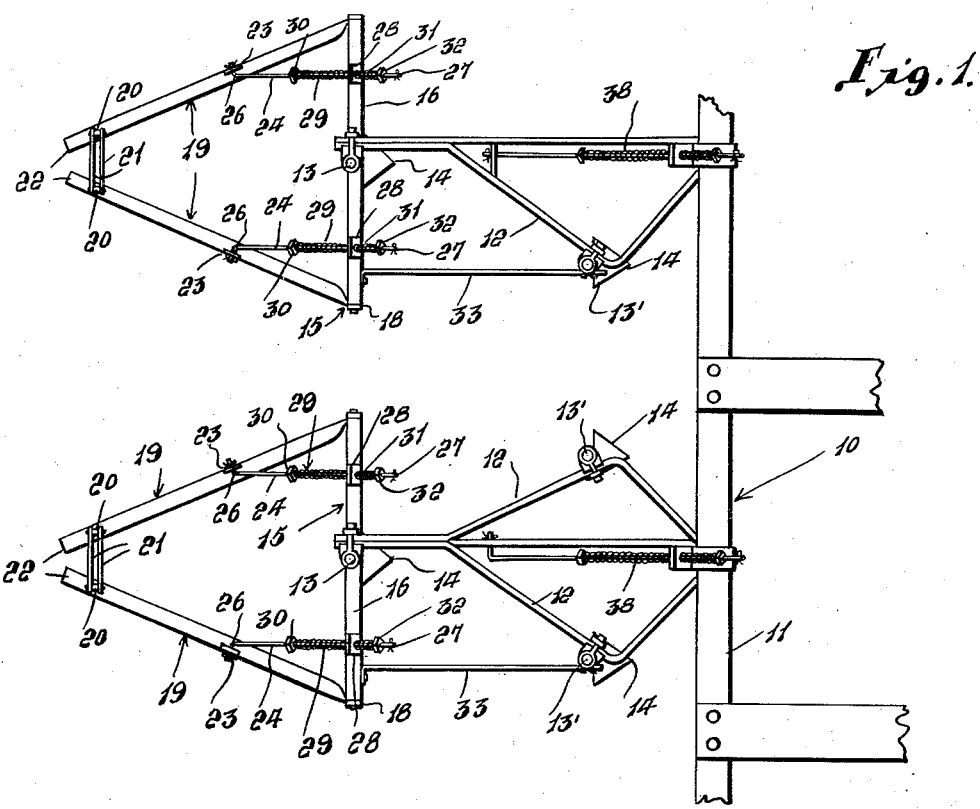
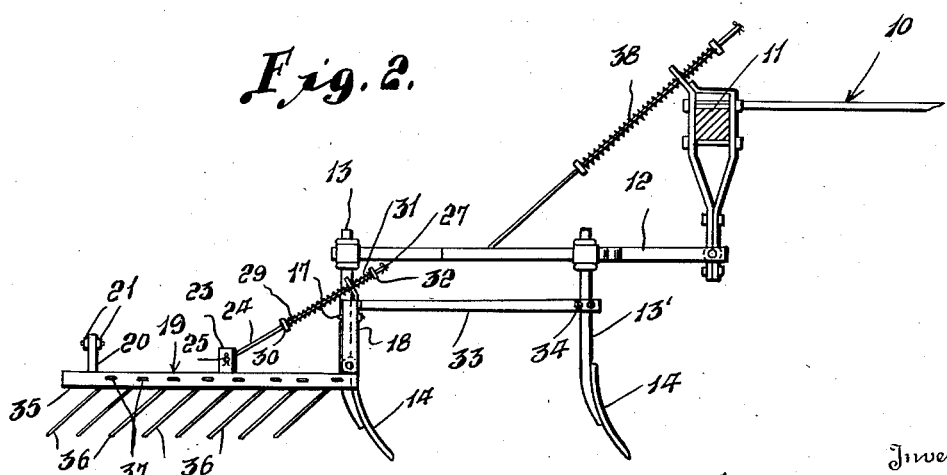
Inventor
Frank Madden
By L. F. Kendrick
Attorney

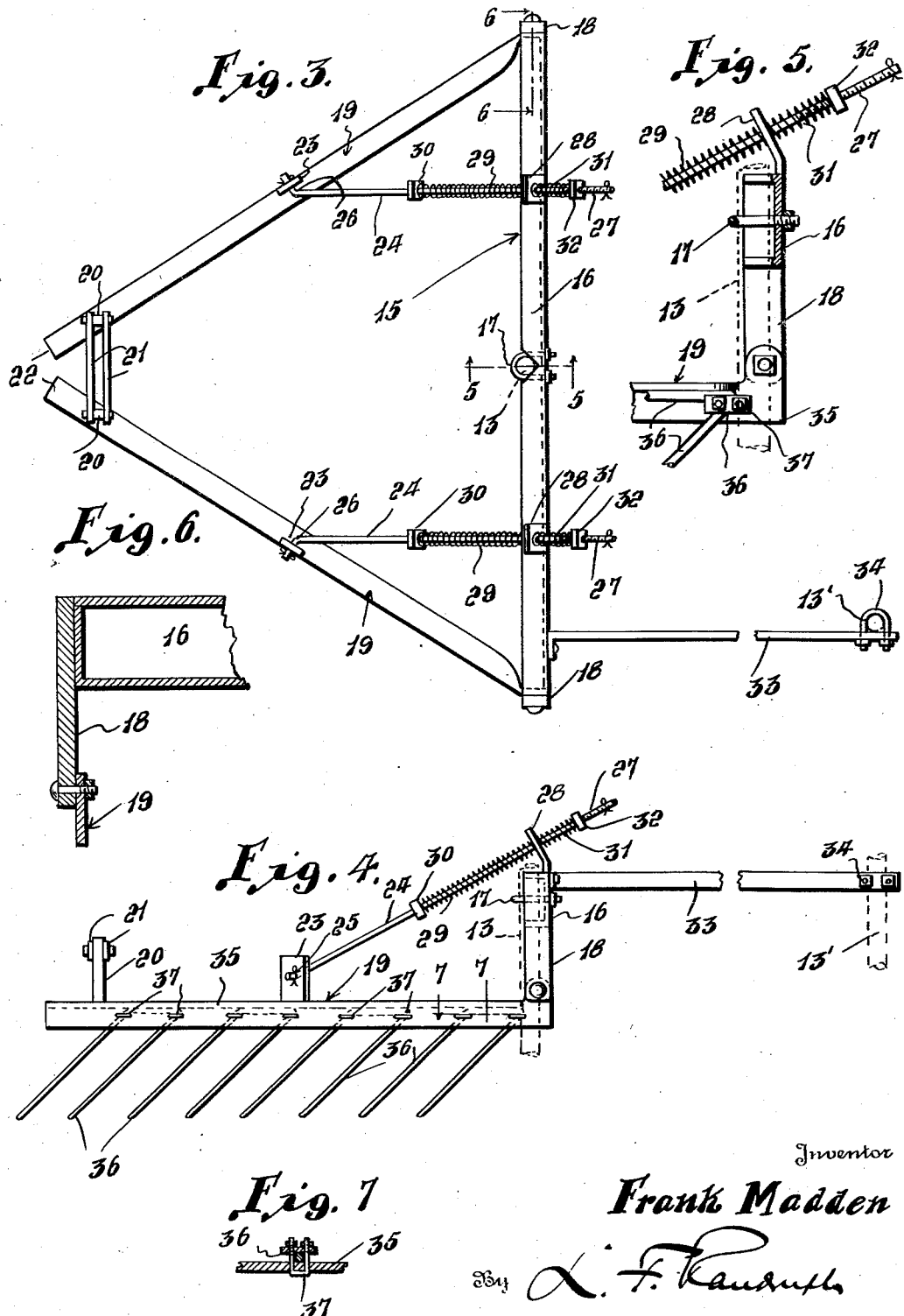

Patented Aug. 29, 1939

2,171,451

UNITED STATES PATENT OFFICE 2,171,451

RAKE ATTACHMENT FOR CULTIVATORS

Frank Madden, Earlville, Ill.

Application March 10, 1938, Serial No. 195,139

9 Claims. (Cl. 97—8)

This invention relates to a raking attachment for gang plow cultivators.

It is an object of this invention to provide an attachment adapted to be readily connected to a gang plow cultivator to rake and smooth the earth behind the plowshares of said cultivator.

It is a further aim of this invention to provide an improved rake including a plurality of raking members each mounted in a manner to prevent them from being damaged by contact with obstructions.

More particularly it is an object of this invention to provide a plurality of raking members disposed at an angle to the direction of movement and independently movable to prevent the members from being damaged by engagement with obstructions.

Other objects and advantages of the invention will hereinafter become more fully apparent from the following specification of which the drawings form a part, and wherein:

Figure 1 is a fragmentary top plan view of a gang plow cultivator showing two of the rake members attached thereto, Figure 2 is a side elevational view of the same, Figure 3 is an enlarged top plan view of one of the raking attachments as seen in Figures 1 and 2, Figure 4 is a side elevational view of the same, Figure 5 is a vertical sectional view taken on the line 5—5 of Figure 3, Figure 6 is a similar view taken on the line 6—6 of Figure 3, and Figure 7 is a horizontal sectional view taken on the line 7—7 of Figure 4.

Referring more particularly to the drawings wherein like reference characters designate like or corresponding parts throughout the different views, 10 designates generally a portion of a gang plow cultivator including the main frame 11 and a plurality of plow frames 12 attached in spaced relationship to the rear end of the frame 11, and each supporting a plurality of plow standards 13 carrying plowshares 14. The cultivator 10 forms no part of the present invention, and is shown merely to illustrate the invention which will hereinafter be described.

The invention comprises a plurality of rakes, designated generally 15, adapted to be attached behind each of the frames 12 as best seen in Figure 1.

Each of the rakes 15 includes a beam 16, preferably formed of angle iron, which is connected by means of a fastening 17 to the rearmost standard 13 of each frame 12, and disposed transversely to said frame. A hanger 18 depends from each end of the beam 16 and has a rake member 19 pivotally connected adjacent its lower end. The rake members 19 are pivotally connected at one of their ends to the hanger 18, and extend rearwardly and inwardly therefrom with their opposite ends disposed adjacent each other, and provided with upwardly extending rods 20 to which are pivotally connected the links 21. Links 21 and rods 20 combine to pivotally connect the free ends 22 of the rake members 19.

Disposed intermediate the ends of each of the rake members 19 is an upwardly extending plate 23 having an opening to receive one end of a rod 24 which is removably held in engagement therewith by a fastening 25. Rod 24 is bent at 26 adjacent the point where it engages plate 23 to limit the extent to which it can be inserted into the plate. The opposite end 27 of rod 24, which is threaded, extends through a plate 28 projecting upwardly from the beam 16, and is slidably mounted therein. A coil spring, of the expansion type, is mounted on the rod 24 between plates 23 and 28 with one end in engagement with plate 28 and the opposite end engaging a lock washer 30 mounted on rod 24. End 27 also carries a small expansion spring 31 having its ends engaging plate 28 and a nut 32 mounted on end 27. Secured to one end of the beam 16 is a rod 33 which extends forwardly and has its free end secured by a fastening 34 to a standard designated 13' to prevent the beam 16 from swinging relatively to the standard 13 to which it is secured.

Each of the rake members 19 comprise the rake heads 35, preferably formed of angle iron, and the teeth 36, which are removably secured to the heads 35 by the fastenings 37, as best seen in Figure 7. As seen in Figure 4, the teeth 36 are made in pairs and are substantially U-shaped with their free ends depending downwardly from the heads 35. These teeth 36 extend downwardly and rearwardly, relatively to the normal direction of movement of the cultivator 10 so that they can more readily bend to avoid any obstruction, thereby preventing the teeth 36 from being bent or damaged.

From the foregoing it will be seen, that a rake 15 as heretofore described, can be mounted behind each set of plowshares 14 connected to each of the frames 12 of a cultivator 10 to rake the earth behind the plows 14. As heretofore explained each of the rake members 19 connected to the beams 16 are pivotally mounted relatively to the beams, and are held in engagement with the earth by the rods 24 and the coil springs 29 carried thereby. The springs 31 and the springs 29 may be adjusted by means of the nut 32 and the washer 30, respectively, to vary the pressure on rakes 19, and the springs 31 also act as a cushioning device to prevent the springs 29 from driving the teeth 36 into the earth after they pass over an obstruction. The rakes 19 are each pivotally connected at their forward ends by the hangers 18 so that they will raise simultaneously should the teeth of either rake strike an obstruction, and this feature together with the diagonal arrangement of the teeth 36 tends to prevent damage to the rake members. Links 21, which may be rigidly secured to posts 20, if desired, hold the rear ends of the rakes 19 in spaced apart relationship to each other so that the teeth will not become clogged by collected dirt or the like, which will be directed inwardly to be released through the rear ends of the rakes.

The frames 12 are also provided with spring means to permit them to move relatively to the cultivator frame 11 so that the shares 14 may raise to avoid an obstruction, this means being generally designated 38.

Various modifications and changes in the construction and means of attaching the rake forming this invention, can obviously be made to adapt the invention to various forms of cultivators, and the invention as disclosed is only intended to illustrate a preferred form thereof and the right is reserved to make such changes and modifications as do not depart from the spirit and scope of the invention as hereinafter defined by the claims.

I claim as my invention:

1. A device of the class described comprising a beam, hangers depending from either end of said beam, rakes pivotally connected to said hangers and extending rearwardly therefrom, and the free ends of said rakes being pivotally connected by means of a link, said device being adapted to be attached to a plow standard.

2. In a device of the class described, a beam adapted to be attached to a plow standard, rakes pivotally connected to the ends of said beam and extending rearwardly and inwardly therefrom, means connecting the free ends of said rakes, and means connected to said rakes and to said beam to normally hold the rakes in engagement with the ground and to permit the rakes to be raised as a unit.

3. A cultivator rake comprising a beam, a rake pivotally connected to each end of said beam and extending rearwardly and inwardly relatively thereto, link means connecting and spacing the free ends of said rakes, a rod connected to each of said rakes and to said beam, and coil springs carried by said rods to normally hold the rakes in engagement with the earth, and to permit them to rise against the action of said springs to pass over obstructions.

4. In a rake attachment for gang plow cultivators, beams connected to and disposed transversely of said cultivator, rakes pivotally connected to the opposite ends of said beams, and extending rearwardly and inwardly relatively thereto, means pivotally connecting the free ends of said rakes, and means normally holding said rakes in engagement with the earth, whereby said rakes can rise to pass over an obstruction, said means normally maintaining the rake heads in a horizontal position.

5. In a rake, a supporting member, rake members secured to each end of said supporting member, the free ends of said rake members being pivotally connected, and spring means resiliently supporting the rake members to normally maintain them in a horizontal position with the teeth of the rake members in engagement with the earth.

6. In a rake, a pair of pivotally mounted rake heads, said heads being disposed diagonally to their direction of movement, the free ends of said heads being disposed adjacent each other and connected by means of a link member, and each of said heads being provided with a plurality of depending diagonally disposed spring teeth.

7. An attachment for gang plow cultivators comprising a rake adapted to be connected to each of a set of plowshares, each of said rakes comprising a pair of rake members disposed diagonally to the direction of movement of the cultivator and behind a plurality of shares, and adjustable spring means normally holding said rakes in engagement with the earth, with the rake heads in a horizontal position.

8. In a rake, a beam adapted to be secured to plow standard and to be disposed transversely to the direction of movement of a plow, rake heads pivotally connected to the ends of said beam and projecting rearwardly therefrom in converging relationship to each other, means connecting the free ends of said rakes for maintaining them in spaced apart relationship to each other, tines depending from said rake heads for engagement with the earth, and means for resiliently supporting said rake heads, said means being adjustable for normally maintaining the rake heads at a proper angle relatively to the earth's surface.

9. A device as in claim 8, said rake supporting means comprising rods pivotally connected to said rake heads, plates projecting upwardly from said beam and provided with openings in which said rods are slidably mounted, expansion coil springs carried by said rods for engaging the opposite sides of said plates, and adjustable means mounted on said rods to engage the opposite ends of said springs for tensioning them relatively to each other to thereby resiliently mount the rake heads and normally maintain them at a proper angle relatively to the earth's surface.

FRANK MADDEN.